(12) United States Patent
Khosravi et al.

(10) Patent No.: US 8,307,175 B2
(45) Date of Patent: Nov. 6, 2012

(54) DATA RECOVERY AND OVERWRITE INDEPENDENT OF OPERATING SYSTEM

(75) Inventors: Hormuzd M. Khosravi, Portland, OR (US); Mojtaba Mojy Mirashrafi, Portland, OR (US); Duncan Glendinning, Chandler, AZ (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 12/492,964

(22) Filed: Jun. 26, 2009

(65) Prior Publication Data

US 2010/0332744 A1    Dec. 30, 2010

(51) Int. Cl.
G06F 12/00 (2006.01)
G06F 13/00 (2006.01)
G06F 13/28 (2006.01)

(52) U.S. Cl. ........ 711/161; 711/162; 711/112; 711/163; 710/22

(58) Field of Classification Search .................. 711/161, 711/162, 163, 112; 710/22
See application file for complete search history.

(56) References Cited

U.S. PATENT DOCUMENTS

| | | | |
|---|---|---|---|
| 5,005,121 A * | 4/1991 | Nakada et al. ................. | 710/26 |
| 5,345,252 A | 9/1994 | Hannah | |
| 5,504,416 A | 4/1996 | Holloway et al. | |
| 5,717,394 A | 2/1998 | Schwartz et al. | |
| 5,884,310 A | 3/1999 | Brichta et al. | |
| 5,901,327 A | 5/1999 | Ofek | |
| 5,987,506 A | 11/1999 | Carter et al. | |
| 6,134,603 A | 10/2000 | Jones et al. | |
| 6,226,746 B1 | 5/2001 | Scheifler | |
| 6,434,681 B1 | 8/2002 | Armangau | |
| 6,487,607 B1 | 11/2002 | Wollrath et al. | |
| 7,120,767 B2 * | 10/2006 | Hara et al. ...................... | 711/161 |
| 7,219,169 B2 * | 5/2007 | Lee et al. ......................... | 710/22 |
| 7,325,110 B2 * | 1/2008 | Kubo et al. .................... | 711/162 |
| 7,389,539 B1 | 6/2008 | Kouznetsov | |
| 7,392,489 B1 | 6/2008 | Jackson et al. | |
| 7,533,229 B1 | 5/2009 | Van Rietschote | |
| 7,613,858 B1 | 11/2009 | Jackson et al. | |

(Continued)

OTHER PUBLICATIONS

Gudgin, et al., "Soap Version 1.2 Part 1: Messaging Framework (Second Edition)," W3C Recommendation, Apr. 27, 2007, 49 pages, available at: http://www.w3.org/TR/2007/REC-soap12-part1-20070427/ Latest Version: http://www.w3.org/TR/soap12-part1/ Previous Versions: http://www.w3.org/TR/2006/PER-soap12-part1-20061219/.

(Continued)

Primary Examiner — Stephen Elmore
Assistant Examiner — Mark Giardino, Jr.
(74) Attorney, Agent, or Firm — Garrett IP, LLC

(57) ABSTRACT

Methods and systems to access data in a computer system independent of an operating environment of the computer system, including to recover data to a remote system, to overwrite data, and to copy data to a hidden partition. A management system may directly access a storage device of the computer system and communicate with the remote system over a data channel that is secure from an operating environment of the computer system. The management system may access the storage device on a block basis, using a device driver associated with a storage device controller, and may include a virtualization engine to access the storage device. The remote system may include logic to request meta-data, to identify disk blocks corresponding to files of interest from the meta-data, and to construct the files of interest from the disk blocks.

10 Claims, 4 Drawing Sheets

U.S. PATENT DOCUMENTS

| | | | |
|---|---|---|---|
| 7,882,318 B2 | 2/2011 | Savagaonkar et al. | |
| 7,937,547 B2 | 5/2011 | Liu et al. | |
| 2004/0107345 A1 | 6/2004 | Brandt et al. | |
| 2006/0253724 A1* | 11/2006 | Zhang | 714/2 |
| 2009/0132839 A1 | 5/2009 | Rothman et al. | |
| 2009/0249260 A1 | 10/2009 | Wakabayashi | |
| 2010/0250797 A1 | 9/2010 | Khosravi et al. | |
| 2010/0306177 A1 | 12/2010 | Khosravi et al. | |
| 2010/0325729 A1 | 12/2010 | Khosravi et al. | |
| 2011/0125960 A1 | 5/2011 | Casselman | |

OTHER PUBLICATIONS

"Architecture Guide: Intel® Active Management Technology," Intel® Software Network, retrieved on Apr. 28, 2009, 18 pages, available at: http://software.intel.com/en-us/articles/architecture-guide-intel-active-management-technology/.

Working Draft American National Project Standard, T13 1532D, "Information Technology—AT Attachment with Packet Interface—7, vol. 1—Register Delivered Command Set, Logical Register Set (ATA/ATAPI-7 V1)," Revision 4a, Mar. 31, 2004, pp. 1-393.

"External Serial ATA," White Paper—Silicon Image, Sep. 2004, pp. 1-16.

Intel, "Intel® Active Management Technology Overview," Release 4.0.3 Jun. 2008, pp. 14.

"Intel® Active Management Technology," retrieved on Apr. 17, 2009, 2 pages, available at: http://www.intel.com/technology/platform-technology/intel-amt/.

Postel, J. et al., "File Transfer Protocol (FTP)," Network Working Group, Obsoletes RFC: 765 (IEN 149), Oct. 1985, pp. 1-70.

Chadalapaka, M., "Internet Small Computer System Interface (iSCSI) Corrections and Clarifications," Network Working Group, Category: Standards Track, Oct. 2007, pp. 1-39.

Dierks, T., "The Transport Layer Security (TLS) Protocol Version 1.2," Network Working Group, Category: Standards Track, Aug. 2008, pp. 1-105.

"McAfee Enterprise Security Suite Solutions," Proactive enterprise threat protection, Data Sheet, 2006, pp. 1-4.

"Symantec AntiVirus TM Corporate Edition," Data Sheet: Virus Protection and Endpoint Security, Automated defense and response against the latest viruses, spyware, and adware, symantecTM, 2009, pp. 1-4.

"Symantec TM Scan Engine," Data Sheet: Messaging Security: Content Filtering, Fast, scalable, and reliable content scanning services and API for protection against viruses and other unwanted content, symantecTM, 2008, pp. 1-2.

Khosravi, Hormuzd M. Office Action Response for U.S. Appl. No. 12/475,216, filed Mar. 23, 2012, 11 pages. Publication No. US2010-0306177A1, published Dec. 2, 2010.

Khosravi, Hormuzd M. Office Action received for U.S. Appl. No. 12/475,216, mailed on Aug. 12, 2011, 22 pages. Publication No. US2010-0306177A1, published Dec. 2, 2010.

Khosravi, Hormuzd M. Office Action received for U.S. Appl. No. 12/487,878, mailed on Sep. 28, 2011, 22 pages. Publication No. US2010-0325729A1, published Dec. 23, 2010.

* cited by examiner

DATA RECOVERY AND OVERWRITE INDEPENDENT OF OPERATING SYSTEM

BACKGROUND

In order to protect against unauthorized access to data stored in a portable computer system, the computer system may be configured to disable itself, or to be remotely disabled upon one or more events, such as excessive login attempts, failure to communicate with a remote system within a scheduled time, or a user-reported loss or theft of the computer system.

A computer system may be disabled by deleting or blocking access to software based encryption keys, or by preventing an operating system from booting. Data stored in a lost or stolen computer may, however, be at risk of unauthorized access such as through another operating system or boot disk.

BRIEF DESCRIPTION OF THE DRAWINGS/FIGURES

Figure 1:
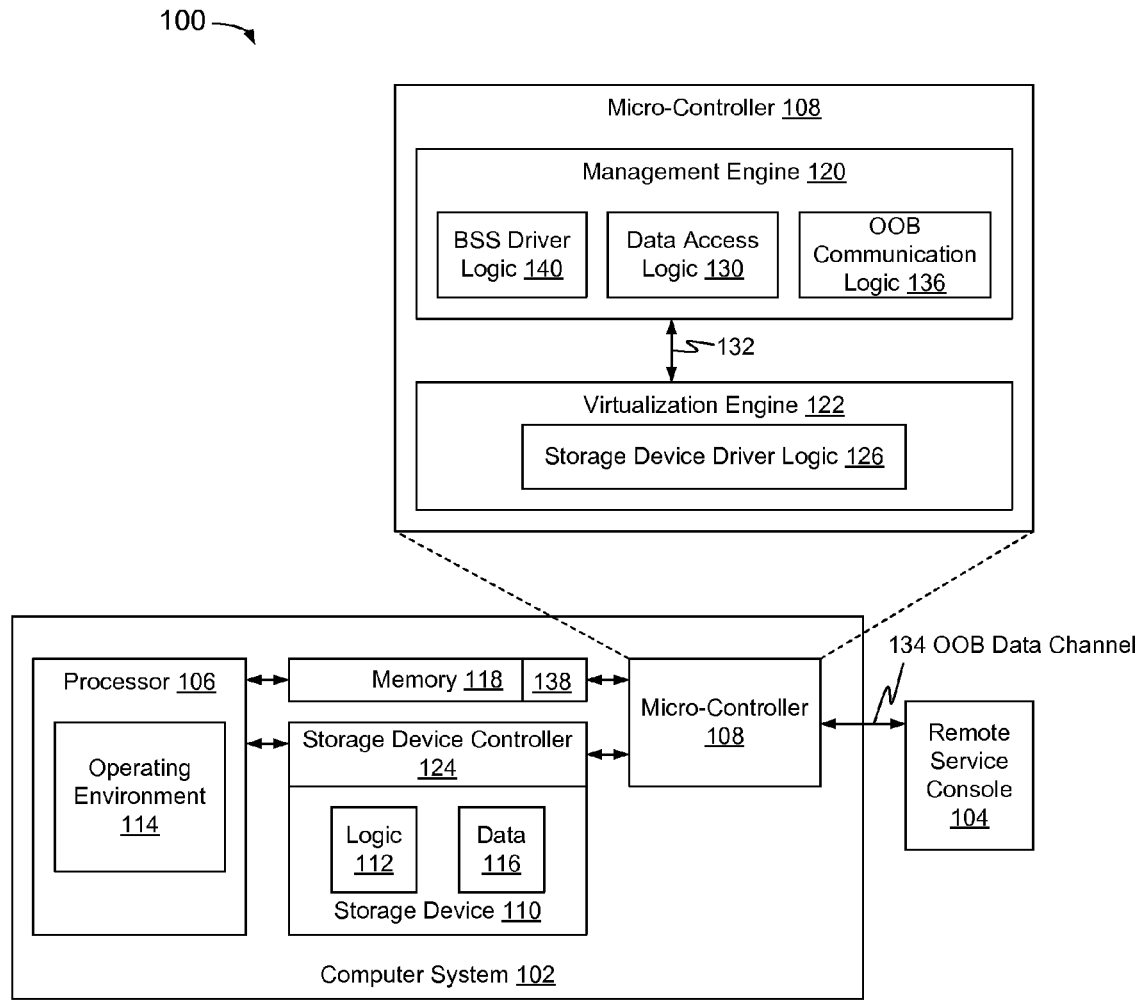
FIG. 1 is a block diagram of an exemplary computer environment, including a computer system and a remote service console, wherein the computer system includes a processor and a micro-controller, and the micro-controller includes data access logic to access a storage device independent of an operating environment of the processor.

In the drawings, the leftmost digit(s) of a reference number identifies the drawing in which the reference number first appears.

DETAILED DESCRIPTION

Disclosed herein are methods and systems to access data in a computer system independent of an operating environment of the computer system, including to recover data, to overwrite data, and to copy data to a hidden partition. One or more features disclosed herein may be implemented to recover and/or prevent unauthorized access to data in a computer system that has become physically inaccessible, such as through loss or theft.

FIG. 1 is a block diagram of an exemplary computer environment 100, including a computer system 102 and a remote service console (RSC) 104.

Computer system 102 includes a plurality of instruction processors, illustrated here as a processor 106 and a micro-controller 108, each to execute computer program logic, also known as instructions, code, software, and firmware.

Computer system 102 includes a storage device 110, which may include, without limitation, one or more of a hard disk drive, a serial advanced technology attachment (SATA) drive, an integrated drive electronics (IDE) drive, a universal serial bus (USB) storage device, and a peripheral component interconnect express (PCI-e) storage device. Storage device 110 may include a storage device controller 124 to control access to storage device 110.

Storage device 110 includes a computer readable medium having computer program product logic 112 stored thereon, to cause processor 106 to perform one or more functions in response thereto.

Logic 112 may include one or more of applications logic and driver logic, and may include operating system logic to cause processor 106 to provide an operating environment 114 within which to execute the application and driver logic.

Logic 112 may include virtual machine management (VMM) logic, which may further include VMM hardware, to cause processor 106 to host a plurality of virtual machines and/or operating environments.

Storage device 110 further includes data 116, which may be used by and/or generated by processor 106 in response to logic 112.

Computer system 102 may include memory 118 to store logic 112 and data 116, or portions thereof, during operation.

Micro-controller 108 may include data access logic 130 to access storage device 110 independent of operating environment 114. Data access logic 130 may be implemented as part of a management engine (ME) 120.

Micro-controller 108 may include block storage service (BSS) driver logic 140 to access storage device 110 on a block basis. This may provide faster access to storage device 110. BSS driver logic 140 may include one or more of read logic and write logic. BSS logic 140 may be implemented as part of ME 120.

Micro-controller 108 may include storage device driver logic 126 configured in accordance with controller 124 to cause micro-controller 108 to communicate with controller 124. Storage device driver logic 126 may be implemented as part of a virtualization engine (VE) 122 configured to virtualize storage controller 124.

ME 120 and VE 122 may be configured to communicate with one another over a management engine communication interface (MECI) 132.

ME 120 may be configured to receive commands from RSC 104 over a data channel that is out of bounds with respect to operating environment 114, illustrated here as out of bounds (OOB) data channel 134. ME 120 may include OOB communication logic 136 to communicate with remote storage console 104 over OOB data channel 134.

OOB data channel 134 may include one or more of a wired data channel and a wireless data channel, which may include, without limitation, one or more of a third generation (3G) wireless data channel, a worldwide interoperability for microwave access (WiMax) wireless data channel, and a short message system (SMS) wireless data channel.

OOB communication logic 136 may include logic to cause micro-controller 108 to receive instructions from RSC 104. Data access logic 130 may include logic to cause micro-controller 108 to perform one or more of retrieve data 116, copy data 116 to a hidden partition of storage device 110, encrypt data 116 that is copied to the hidden partition, and overwrite data 116, in response to commands received from RSC 104 over OOB data channel 134. OOB communication logic 136 may include logic to cause micro-controller 108 to send data 116 to RSC 104 over OOB data channel 134.

Micro-controller 108 or portions thereof may be configured to be always on. Alternatively, when computer system 102, or portions thereof, are in a sleep or power down state, micro-controller 108 may be configured to wake upon receipt of a message over OOB data channel 134. Micro-controller 108 or portions thereof may be configured to run on auxiliary power to be available when processor 106 is in a low power or power down state.

ME 120 and VE 122, or portions thereof, may be implemented in hardware, software, firmware, and combinations thereof. For example, and without limitation, logic associated with one or more of ME 120 and VE 122 may be provided in firmware that is secure from operating environment 114 and processor 106. An image of the firmware may be copied to a portion 138 of memory 118 at start-up or upon booting, to be executed by micro-controller 108. Memory portion 138 may be configured with hardware and/or software to be inaccessible to operating environment 114.

Micro-controller 108 and RSC 104, or portions thereof, may be configured to operate independent of operating environment 114.

One or more features disclosed herein may be implemented as part of an anti-theft protection system configured to deactivate, disable, and/or lock computer system 102, upon a suspected loss or theft of computer system 102.

One or more features disclosed herein may be implemented as part of a computer management system, such as an Active Management Technology system developed by Intel Corporation of Santa Clara, Calif.

Figure 2:
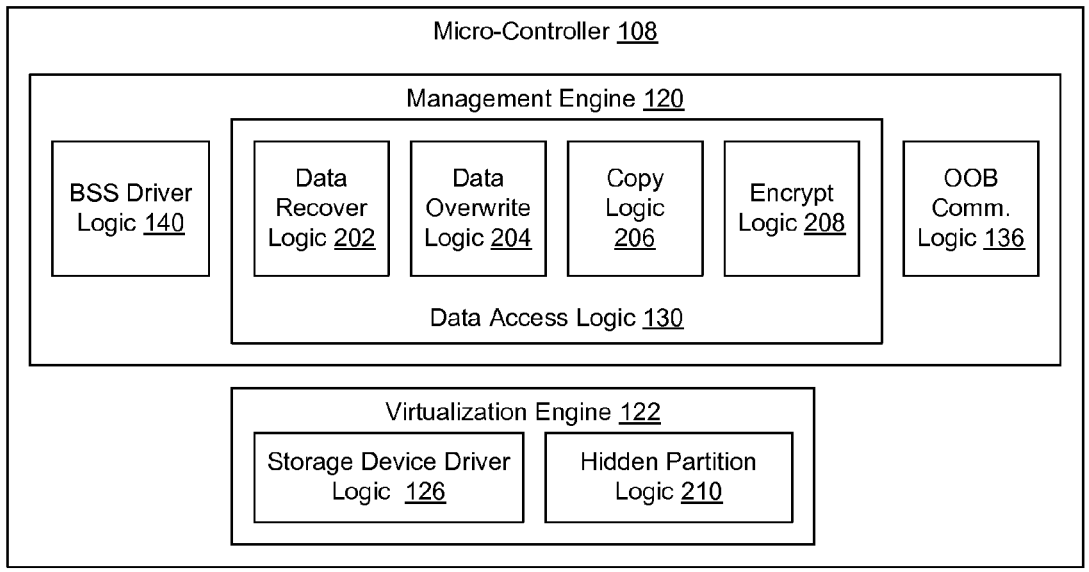
FIG. 2 is an exemplary block diagram of the micro-controller.

FIG. 2 is an exemplary block diagram of micro-controller 108, wherein data access logic 130 includes data recovery logic 202 to cause micro-controller 108 to retrieve data from storage device 110. The retrieved data may be sent to RSC 104 under control of OOB communication logic 136.

Data access logic 130 may include data overwrite logic 204 to cause ME 120 to overwrite data in storage device 110. Data overwrite logic 204 may be invoked after data is retrieved and sent to RSC 104.

VE 122 may include hidden partition logic 210 to cause micro-controller 108 to create a hidden partition within storage device 110. Data access logic 130 may include copy logic 206 to cause micro-controller 108 to copy data 116, or portions thereof, to the hidden partition.

Data access logic 130 may include encryption logic 208 to cause micro-controller 108 to encrypt data that is copied to the hidden partition. The data may be encrypted prior to copying, in conjunction with the copying, after the copying, and combinations thereof. Data written to the hidden partition may also be sent to RSC 104 over OOB data channel 134.

Data overwrite logic 204 may be invoked after copying data to the hidden partition, to cause micro-controller 108 to overwrite data in storage device 110, while preserving data in the hidden partition.

RSC 104 may be configured to identify and locate data within storage device 110 to be accessed. For example, and without limitation, RSC 104 may be configured to request meta-data disk blocks related to files within storage device 110. The meta-data may include one or more of a master boot record (MBR), a boot sector, and one or more master file table (MFT) entries.

Data access logic 130 may include logic to cause BSS driver logic 140 to request meta-data disk blocks via VE 122, in response to a command from RSC 104, and OOB communication logic 136 may include logic to send the meta-data disk blocks to RSC 104 over OOB data channel 134.

RSC 104 may include logic to parse the meta-data disk blocks and to identify disk blocks of storage device 110 that correspond to data or data files of interest within storage device 110.

RSC 104 may include logic to send a request or command to ME 120 to access the identified disk blocks within storage device 110. ME 120 may invoke BSS driver logic 140 to access the identified disk blocks within storage device 110, via VE 122, responsive to data access logic 130. ME 120 may perform one or more of: send the disk blocks to RSC 104 over OOB data channel 134; copy the disk blocks to a hidden partition, encrypt the disk blocks, and overwrite storage device 110, or portions thereof.

RSC 104 may include one or more of file system tools and file system drivers, which may run within an operating kernel of RSC 104. The file system tools may include, without limitation, NT file system (NTFS) tools. NTFS tools may be implemented as an application level driver in a Linux kernel, and may include NTFSMount and NTFSCluster application tools to provide remote disk mount functionality, and to retrieve information to identify disk blocks associated with a file.

Figure 3:
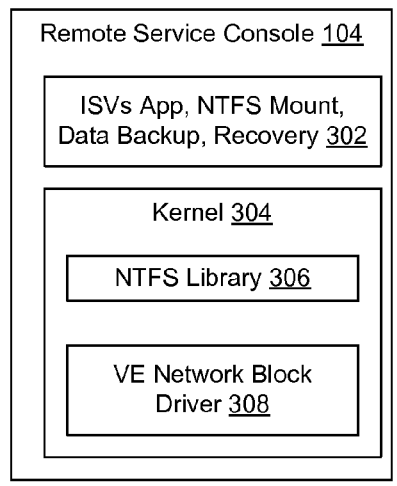
FIG. 3 is an exemplary block diagram of the remote service console.

FIG. 3 is an exemplary block diagram of RSC 104, including logic 302, which may include one or more of independent software vendor (ISV) application logic, remote disk mount logic, data backup logic, and data recovery logic. RSC 104 may include an operating kernel 304, which may include a tool library, illustrated here as an NTFS library 306.

RSC 104 may include a virtualization engine (VE) communication driver, illustrated in FIG. 3 as a VE network block driver (VE driver) 308, to communicate to micro-controller 108. VE driver 308 may include logic to provide a disk block interface to operating environment 114 when operating environment 114 is active, and to communicate with micro-controller 108 outside of and secure from operating environment 114 as described herein.

RSC 104 and ME 120 may communicate with one another in accordance with one or more of a file transfer protocol (FTP), a transmission control protocol (TCP), a short messaging system (SMS) protocol, and a user datagram protocol (UDP).

Where FTP/TCP is implemented, VE driver 306 may be configured as a FTP client, and micro-controller 108 may be configured as a FTP server. Such a configuration may be implemented in accordance with one or more of a 3G wireless communication protocol and a WiMax communication protocol.

SMS based communications may be implemented to trigger micro-controller 108 to initiate a communication session with RSC 104.

Micro-controller 108 may be implemented within a memory controller hub of computer system 102, which may include a graphics and memory controller hub.

Figure 4:
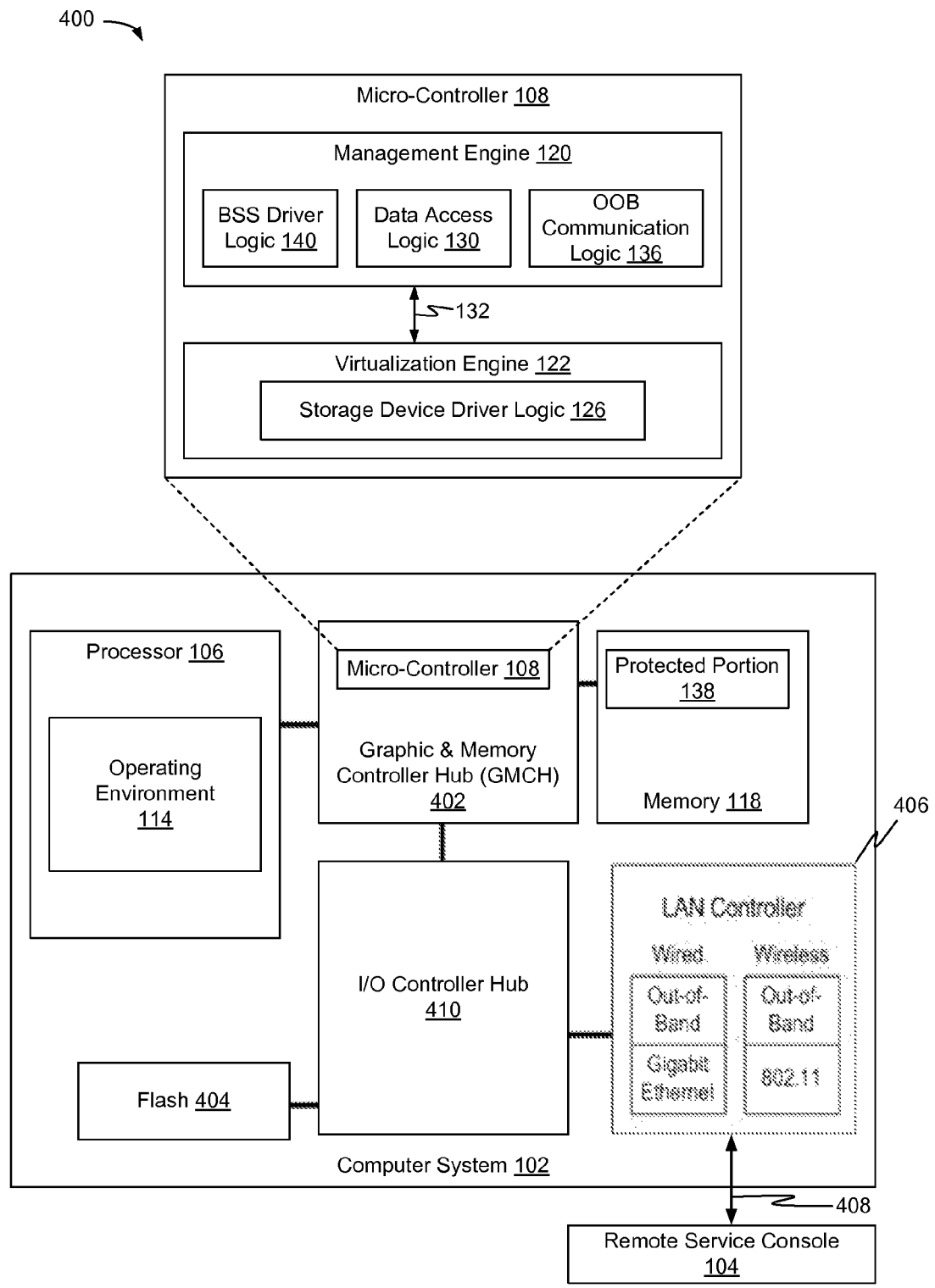
FIG. 4 is a block diagram of another exemplary computer environment, wherein the micro-controller is implemented within a graphics and memory controller hub of the computer system.

FIG. 4 is a block diagram of an exemplary computer environment 400, wherein micro-controller 108 is implemented within a graphics and memory controller hub (GMCH) 402.

A firmware image of ME 120 and VE 122, or portions thereof, may be stored within a flash memory 404. Upon system boot or power-up, the firmware image may be copied from flash memory 204 to memory portion 138, and the corresponding code may be executed from memory portion 138 by micro-controller 108.

Environment 400 may be configured to permit RSC 104 to communicate with ME 120 and operating environment 114. For example, and without limitation, a communication controller, illustrated here as a local area network (LAN) controller 406, may be configured to communicate with RSC 104 over one or more data channels 408, and to direct communications to one or more of processor 106, operating environment 114, and ME 120.

An I/O controller hub 410 may hold filter definitions to be applied to network traffic to and from processor 106, referred to herein as in-band network traffic.

Network traffic to micro-controller 108 or ME 120, referred to herein as out-of-band (OOB) network traffic, may be identified, for example, by dedicated port numbers. LAN controller 406 may include an address resolution protocol (ARP), to forward ARP packets containing a specific internet protocol (IP) address to one or more of processor 106, operating environment 114, and micro-controller 108.

LAN controller 406 may include a dynamic host configuration protocol (DHCP), to forward DHCP offer and acknowledge packets to one or more of processor 106, operating environment 114, and micro-controller 108.

LAN controller 406 may include one or more IP port filters to redirect incoming IP packets on a specific port to micro-controller 108.

Computer system 102 may include a host embedded controller interface (HECI), which may be bi-directional, and which may be configured to permit one or both of operating environment 114 and ME 120 to initiate a transaction with the other and/or with RSC 104.

I/O controller hub 410 may be configured to process in-band and OOB network traffic when the operating environment 114 is active or inactive.

GMCH 402 may be configured to dynamically switch memory power state to allow access to memory portion 138 by micro-controller 108 when processor 106 is in a low power state or a power down state. RSC 104 may be configured to communicate with micro-controller 108 independent of a power state of processor 106 and independent of a condition of operating environment 114.

Figure 5:
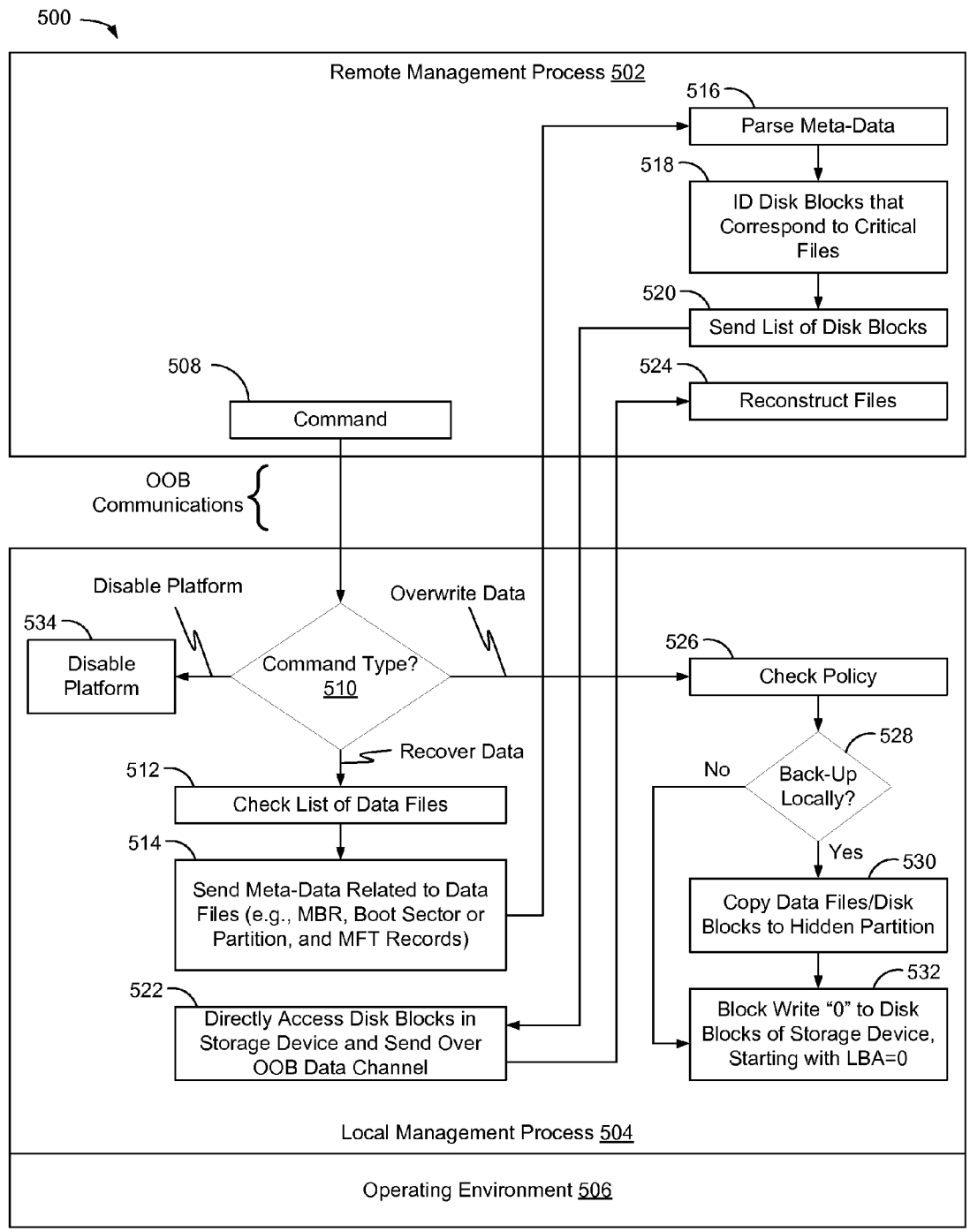
FIG. 5 is a process flowchart of exemplary methods, including a remote management process and a local management process.

FIG. 5 is a process flowchart of an exemplary method 500, including a remote management process 502 and a local management process 504, which are configured to communicate with one another out-of-band (OOB) with respect to an operating environment 506. Remote management process 502 may be implemented with respect to RSC 104, as described above with respect to one or more of FIGS. 1, 3, and 4. Local management process 504 may be implemented with respect to micro-controller 108, as described above with respect to one or more of FIGS. 1, 2, and 4. Method 500 is not, however, limited to RSC 104 and micro-controller 108.

At 508, remote management process 502 sends a command to local management process 504. At 510, local management process 504 initiates processing of the command.

Remote management process 502 may be configured to issue one or more combinations of the retrieve data command, the overwrite data command, and the disable platform command. Remote management process 502 may be configured to issue a combination of commands sequentially and/or simultaneously. For example, and without limitation, remote management process 502 may be configured to issue a disable platform command prior to issuing a retrieve data command and/or an overwrite data command. This may preclude access to the storage device by other than local management process 504.

One or more commands at 508 may be initiated in response to a determination that a computer platform associated with local management process 504 has been misplaced, lost, or stolen.

Where the command includes a recover command, processing proceeds to 512, where local management process 504 may check a list of data files. 512 may include identifying meta-data files or disk blocks associated with one or more particular files of interest.

At 514, local management process 504 may recover meta-data related to the one or more files of interest from a storage device associated with operating environment 506, to remote management process 502. The meta-data may include one or more of a master boot record (MBR), boot sector or partition, and master file table (MFT) records. 514 may include recovering one or more disk blocks that contain the meta-data, referred to herein as meta-data disk blocks.

At 516, remote management process 502 parses the meta-data.

At 518, remote management process 502 analyzes the parsed meta-data and identifies disk blocks that correspond to the files of interest. Remote management process 502 may utilize file system knowledge, such as in conjunction with an NTFS based driver.

At 520, remote management process 502 sends an indication or addresses of the identified disk blocks to local management process 504.

At 522, local management process 504 directly accesses the disk blocks identified at 518, within the storage device. The access at 522 may be independent of operating environment 506, in that the access may be performed without use of software agents within operating environment 506. Accessing of the storage device may include a partial disk mount, remotely invoked by remote management process 502.

The accessed disk blocks are sent to remote management process 502, which reconstructs the corresponding files at 524. Where the data is encrypted, remote management process 502 may be configured to interact with a corresponding encryption process, such as an encryption independent software vendor server, to obtain a suitable decryption key.

Returning to 510, where the command of 508 is an overwrite data command, processing proceeds to 526, where local management process 504 may check one or more policies associated with the command.

At 528, local management process 504 may determine whether to copy one or more data files or disk blocks to a hidden partition of the storage device, and/or whether to send the one or more data files or disk blocks to remote management process 502. The determination at 528 may be performed in response to a policy associated with 526. Where a data file or disk block is to be copied to a hidden partition, processing proceeds to 530. A data file or disk block to be copied to a hidden partition may be encrypted. Copying of a data file or disk block at 530 may include identifying the data file or disk block as described above with respect to one or more of 512 through 524.

After the one or more data files or disk blocks are copied to the hidden partition at 530, or where no data files or disk blocks are to be copied to a hidden partition at 528, processing proceeds to 532, where data in the storage device is over written. Data may be overwritten with logic values of zero, which may be performed on a block basis, and which may begin with a lowest block address (LBA) of zero.

Local management system 504 may be configured to directly access the storage device using virtualizing technology to directly overwrite disk blocks. This may permit overwriting of the disk blocks independent of the storage device type and independent of encryption technology that may be employed with respect to the storage device.

Returning to 510, where the command of 508 is a disable platform command, processing proceeds to 534, where local management process 504 disables a platform associated with operating environment 506. Disabling may include, without limitation, one or more of interrupting a boot process, such as by precluding the boot process from prompting a user for a password, and/or deleting or blocking access to encryption keys. Disabling may be performed to preclude booting of the platform from another operating system and/or a recovery disk.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A computer program product including a non-transitory computer readable medium having computer program logic stored therein, the computer program logic including:
    management system logic to cause a first processor to selectively access disk blocks within a storage device independent of and secure from an operating environment of a second processor that is configured to access the storage device, wherein the management system logic includes one or more of,
        data recover logic to cause the first processor to retrieve selected disk blocks from the storage device and send selected disk blocks from the storage device to a remote system over a data channel that is inaccessible to the operating environment,
        data copy logic to cause the first processor to copy selected disk blocks of the storage device to a hidden partition of the storage device, and
        data overwrite logic to cause the first processor to overwrite selected disk blocks in the storage device,
    wherein the computer program logic further includes remote system logic, and:
        the management system logic includes logic to cause the first processor to retrieve and send meta-data disk blocks from the storage device to the remote system over the data channel in response to a command from the remote system over the data channel;
        the remote system logic includes logic to cause a remote system processor to identify, from the meta-data disk blocks, disk blocks that correspond to one or more files of interest;
        the management system logic further includes logic to cause the first processor to retrieve and send the identified disk blocks from the storage device to the remote system over the data channel; and
        the remote system logic further includes:
            logic to cause the remote system processor to reconstruct the one or more files of interest from the disk blocks; and
            file system tools logic, including remote disk mount logic and address virtualization logic, to cause the remote system processor to invoke the first processor to mount and access at least a portion of the storage device from within an operating kernel of the remote system.

2. The computer program product of claim 1, wherein the management system logic further includes:
    block storage service (BSS) driver logic to cause the first processor to request the disk blocks in response to one or more of the data recover logic, the data copy logic, and the data overwrite logic;
    storage device driver logic, configured in accordance with a controller associated with the storage device, to cause the first processor to communicate requests from the BSS driver logic to the controller.

3. A system, comprising:
    a processor to host an operating environment and to access a storage device from within the operating environment; and
    a micro-controller to selectively access disk blocks within the storage device independent of and secure from the operating environment, including one or more of,
        to recover selected disk blocks from the storage device to a remote system over a data channel that is inaccessible to the operating environment,
        to copy selected disk blocks of the storage device to a hidden partition of the storage device, and
        to overwrite selected disk blocks in the storage device,
    wherein:
        the micro-controller is configured to retrieve and send meta-data disk blocks from the storage device to the remote system over the data channel in response to a command from the remote system over the data channel;
        the remote system is configured to identify, from the meta-data disk blocks, disk blocks that correspond to one or more files of interest;
        the micro-controller is further configured to retrieve and send the identified disk blocks from the storage device to the remote system over the data channel; and
        the remote system is further configured to reconstruct the one or more files of interest from the disk blocks, and
    wherein the remote system is further configured to invoke the micro-controller to mount and access a portion of the storage device from within an operating kernel of the remote system.

4. The system of claim 3, wherein the micro-controller includes:
    a management engine including a block storage service (BSS) driver to generate disk block access requests and a data access module to invoke the BSS driver to perform one or more of the recover, the copy, and the overwrite; and
    a virtualization engine including a storage device driver to communicate with a controller associated with the storage device responsive to the management engine.

5. The system of claim 3, wherein:
    the micro-controller is configured to copy an image of computer program logic from firmware that is inaccessible to the processor to a portion of system memory associated with the processor;
    the micro-controller is configured to execute the computer program logic from the portion of memory; and
    the portion of system memory is access protected with respect to the operating environment.

6. The system of claim 3, wherein the processor and the micro-controller are embedded within a set of one or more integrated circuit chips mounted on a circuit board.

7. The system of claim 3, wherein the micro-controller is implemented as a coprocessor to the processor.

8. The system of claim 3, wherein the micro-controller is integral to the processor.

9. The system of claim 3, wherein the micro-controller is configured to access disk blocks within the storage device when other devices of the system are in a low power state and when the operating environment is inactive.

10. A method, comprising:
   selectively accessing disk blocks within a storage device independent of and secure from an operating environment of a processor that is configured to access the storage device, wherein the selectively accessing includes one or more of,
      recovering selected disk blocks from the storage device to a remote system over a data channel that is inaccessible to the operating environment,
      copying selected disk blocks of the storage device to a hidden partition of the storage device, and
      overwriting disk blocks in the storage device, wherein the selectively accessing includes:
         retrieving and sending meta-data disk blocks from the storage device to the remote system over the data channel in response to a command from the remote system over the data channel;
         receiving the meta-data disk blocks at the remote system and identifying, from the meta-data disk blocks, disk blocks that correspond to one or more files of interest;
         retrieving and sending the identified disk blocks from the storage device to the remote system over the data channel; and
         reconstructing the one or more files of interest from the disk blocks at the remote system; and
   remotely initiating a partial mount and access of the storage device.

* * * * *